Aug. 14, 1962  J. B. JACOBSEN ET AL  3,049,134
MULTI-FLIGHT WASHER OR DEGREASER
Filed Sept. 27, 1961  6 Sheets-Sheet 3

INVENTORS.
*John B. Jacobsen*
BY *& Edwin B. Christian,*
EARL J. McNAMARA
*Paul & Paul*
ATTORNEYS.

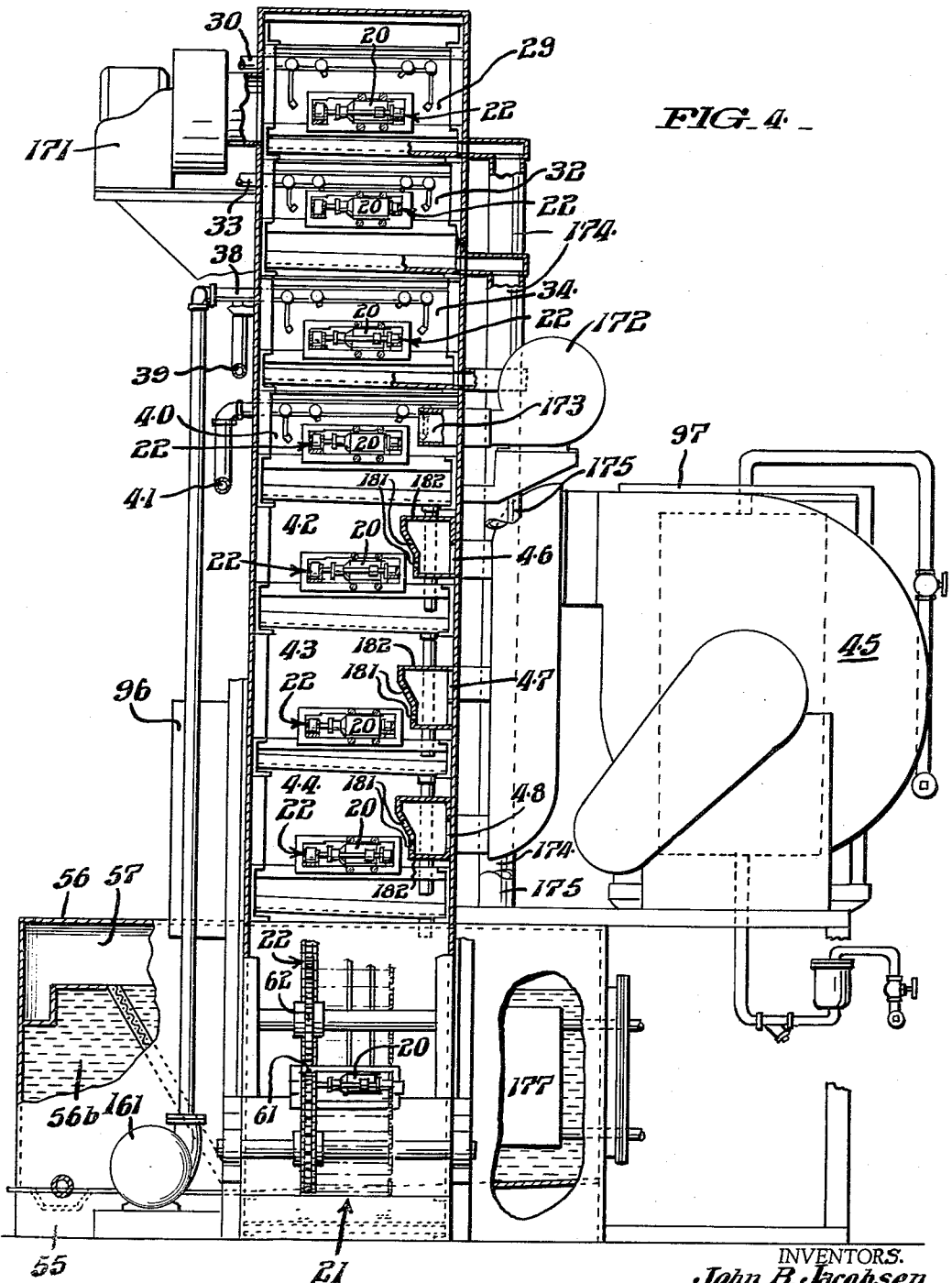

Aug. 14, 1962  J. B. JACOBSEN ET AL  3,049,134
MULTI-FLIGHT WASHER OR DEGREASER
Filed Sept. 27, 1961  6 Sheets-Sheet 5
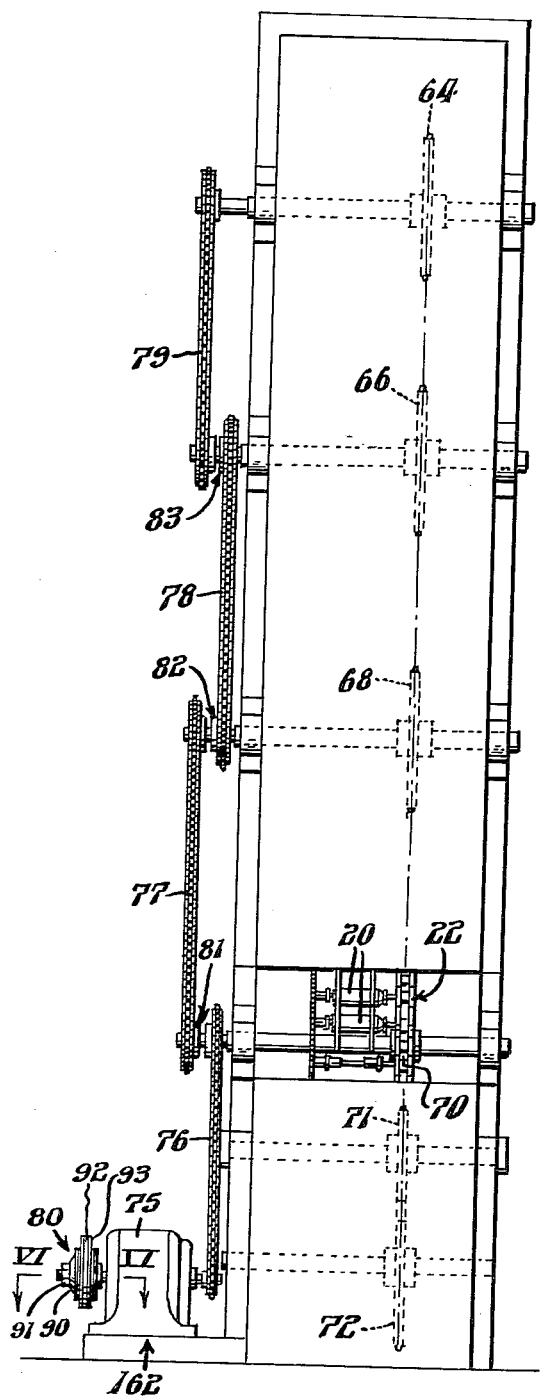
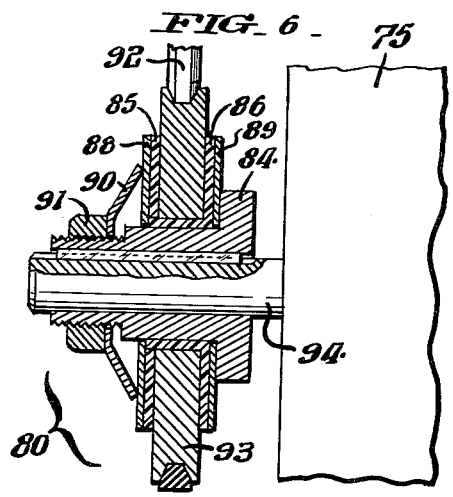
INVENTORS.
John B. Jacobsen
& Edwin B. Christian,
BY Earl J. McNamara
Paul & Paul
ATTORNEYS.

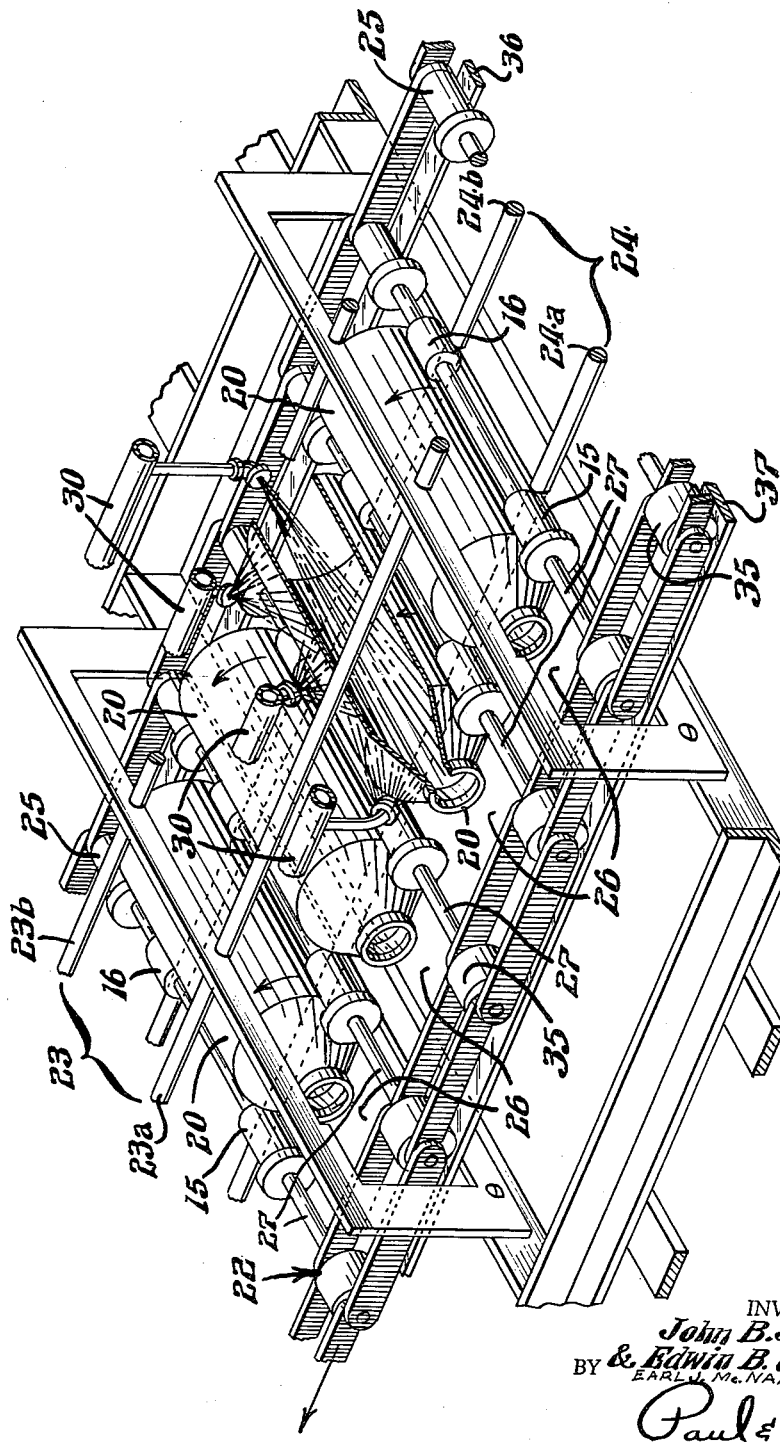

United States Patent Office 3,049,134
Patented Aug. 14, 1962

3,049,134
MULTI-FLIGHT WASHER OR DEGREASER
John B. Jacobsen and Edwin B. Christian, Bowling Green, Ky., and Earl J. McNamara, Trenton, Mich., assignors to Detrex Chemical Industries, Inc., Detroit, Mich., a corporation of Michigan
Filed Sept. 27, 1961, Ser. No. 141,144
5 Claims. (Cl. 134—72)

This invention relates to a multi-flight multi-stage spray washer or degreaser machine. The new machine is particularly adapted for cleaning new cylindrical metal cans or containers during a preliminary stage in their manufacture. At the time of cleaning or degreasing, the cans or containers being manufactured are open at both ends, and may have been produced, for example, by extrusion of an annular disk of aluminum.

A principal object of the present invention is to provide an automatic washer or degreaser machine for cleaning new metal open-ended containers or cans to remove oils, lubricants, greases, dirt and the like, thereby to clean all surfaces of the metal to prepare it for receiving and retaining paint or enamel to be applied thereto by either spray or roller methods.

In a typical case, the cans being manufactured are intended for use as Aero-sol containers, i.e., as containers for compressed gas or air in addition to the particular product. Such type of can or container has become very popular and it is, of course, important that the paint not chip or peel off from either the inner or outer surfaces of the container. For if chipping or peeling should occur on the inner surface, the product contained therein would be contaminated, whereas if the chipping or peeling occurred on the outer surface, the attractiveness and sales appeal of the product would be impaired. It is, accordingly, important that all surfaces of the metal can in its partly-finished open-ended condition be absolutely clean and the achievement of this result is an important object of the washer machine of the present invention.

Another object of the present invention is to provide in a floor space having a length of X feet, a conveyor type washer machine which requires an effective conveyor length of the order of five times X feet.

Both of the above objects are accomplished by a conveyor-type washer machine having a plurality of stories or flights as well as a plurality of stages.

The invention will be best understood by a consideration of the following detailed description of a preferred embodiment of the multi-flight multi-stage spray washer and degreaser machine illustrated in the drawing. For convenience, the machine will be referred to at times merely as a washer. In the drawing:

FIG. 4 is a diagrammatic end elevational view of the loading end of the washer of FIG. 1, partly broken away and in section;

FIG. 5 is a diagrammatic end elevational view of the unloading end of the washer of FIG. 1;

FIG. 6 is an enlarged view in section of one of the torque limiter devices used in driving the conveyor, as seen along the line VI—VI of FIG. 5; and FIG. 7 is a perspective illustration of a portion of the conveyor.

Figure 1:
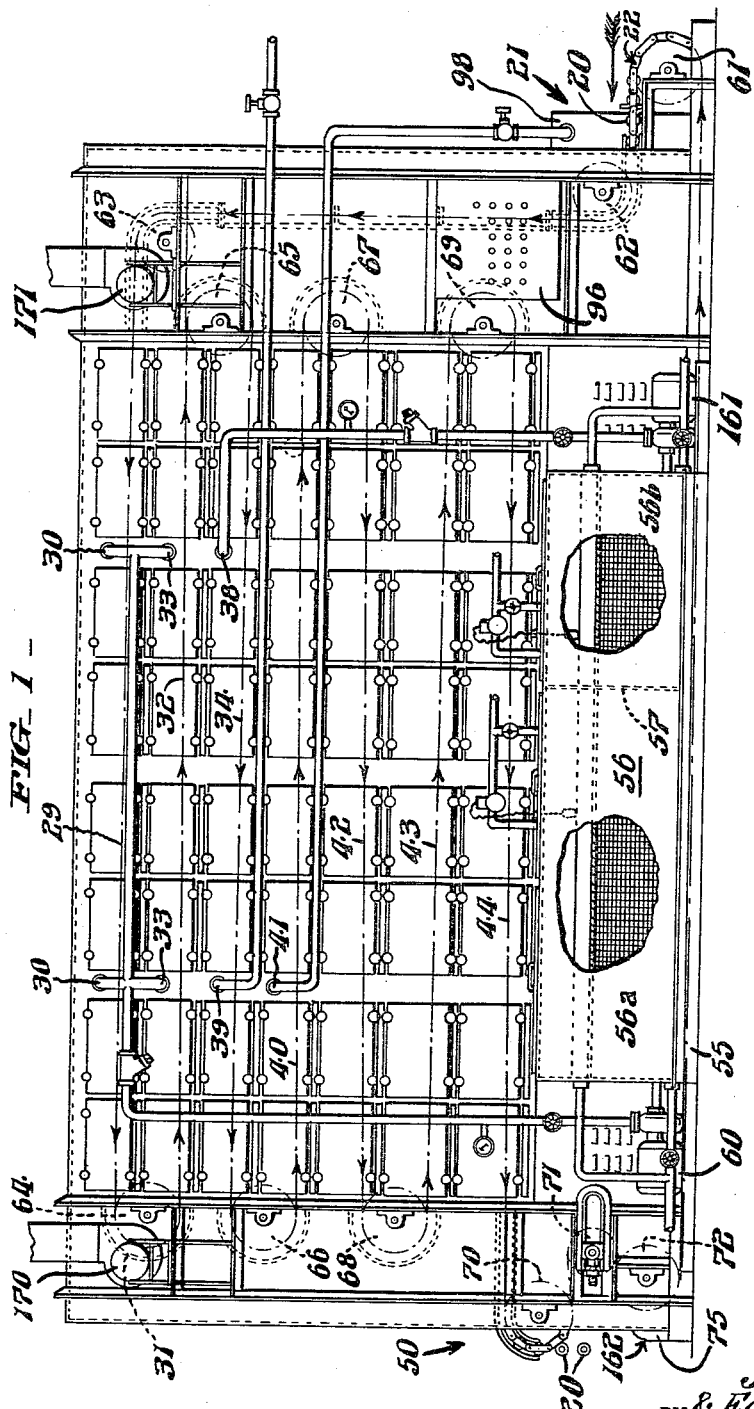
FIG. 1 is a diagrammatic front elevational view, partly broken away, of the washer machine of the present invention.

In describing the preferred embodiment of the invention illustrated in the drawing, specific terminology has been resorted to for the sake of clarity. However, it is not the intention to be limited to the specific terms so selected, and it is to be understood that each specific term includes all technical equivalents which operate in a similar manner to accomplish a similar purpose.

Referring now to the drawing, the partially-fabricated open-end cylindrical cans 20 are deposited, as from an automatic feed machine (not shown) onto the input or load station end 21 of the conveyor 22.

As seen most clearly in FIG. 7, conveyor 22 includes an upper guide track 23 and a lower guide track 24, the upper track comprising the track rails 23a and 23b, and the lower track comprising the track rails 24a and 24b. At the input or load station end 21 of the machine, the upper track rails 23a, 23b, are omitted, so that the cans 20 may be dropped from the automatic feed machine onto the lower track rails 24a, 24b. The cans 20 may be dropped one by one at a rate and at times which are synchronized with the movement of the conveyor 22. For example, while not shown in the drawing, as each roller 25 of the roller chain conveyor 22 passes a selected point at the load end 21 of the machine, it may open a gate on the feeding machine to permit a can to drop into one of the compartments 26 located between the cross pins 27 of the roller chain conveyor 22. A can so dropped is, of course, supported by the rails 24a, 24b of the lower track 24, and is rolled along by the rearward cross pin as the conveyor 22 moves forward.

For the purpose of pushing the cans 20 along, and also for the purpose of guiding the cans, each pin 27 is provided with a pair of spaced-apart collars 15 and 16 the positions of which on the pin 27 are adjustable. For example, the pin 27 may be provided with spaced-apart annular slits for receiving retaining clips for retaining the collar 15 or 16 therebetween. Pins 27 are supported at each end by rollers 25 and 35, rollers 25 being adapted to roll along track 36 and rollers 35 being adapted to roll along track 37. The pins 27 themselves do not rotate, and neither do the collars 15 and 16. Collar 15 is provided with a flange portion for preventing the can 20 being pushed from sliding toward the track 37. The axial position of guide collar 15 on pin 27 is adjustable, as indicated above, and is determined by the length of the can 20. Collars 15 and 16 may preferably be of nylon or other material having substantially frictionless properties so that as the cans 20 are pushed by the collars 15, 16, the cans roll rather than slide along the supporting track rails. The advantages to be gained by rolling the cans along, rather than sliding them along are that all surface areas are subjected to the cleaning operations, and rail marks on the outer surface of the cans are avoided.

As the containers or cans 20 are pushed along, rolling on the lower track rails 24a, 24b as just described, the rails 23a, 23b of the upper track 23 function to retain the cans in their individual compartments 26, preventing the cans from being dislodged, as by the force of a spray.

Referring now to FIGS. 1 and 4, it will be seen that shortly after the cans or containers 20 are received from the loading machine onto the conveyor 22 at the input end of the machine, the cans are carried by the conveyor vertically upward to the top flight 29 of the washing machine. The cans are then carried horizontally (FIG. 1) through a hot spray wash section fed by piping 30 (FIG. 4). In the hot spray wash section, as the cans roll along they are subjected to a hot spray wash at relatively high pressure, for example, 50 p.s.i.

After having traveled the length of the machine on the top flight 29, the cans are carried downward around a 180° turn section 31 and are then returned horizontally on the second flight 32 which also passes through a high pressure hot spray wash fed by piping 33 (FIG. 4).

At the completion of flight 32, the cans are again carried downwardly through a 180° reversing turn to the third flight 34. As they pass through the first portion of the third flight 34, the cans are subjected to a heated rinse spray 38 (FIG. 4) and as they pass through the latter part of the third flight, they are subjected to a fresh cold water rinse fed through piping 39.

At the completion of the third flight 34, the cans are again rolled downwardly around a 180° reversing turn and enter the fourth flight 40. In the first portion of the fourth flight 40, the cans are subjected to a de-ionized cold water rinse fed by piping 41 (FIG. 1) and during the latter part of the fourth flight 40, the cans are subjected to a cold air pressure blow-off.

In the remaining three flights, namely: the fifth flight 42, the sixth flight 43 and seventh flight 44, the cans are dried by hot dry air supplied by blower 45 through the ducts 46, 47 and 48.

At the completion of the seventh or bottom flight 44, the cans are unloaded from the conveyor 22 at the unload end 50 by permitting them to drop from the conveyor as it passes over the return sprocket 70. The containers drop from the conveyor at the unload point because the guide tracks, comprising the guide rails 23a, 23b, 24a, and 24b are terminated. Thus, there is nothing to retain the cans in their compartments 26.

The capacity of the washing machine shown and described may, of course, vary, but as one example of the capacity of a practical machine, assume that cans or containers have an inside diameter of 2" and are being delivered to the load end 21 of the conveyor at a rate of 160 cans per minute. To receive 2" diameter cans, conveyor 22 may be so constructed that the cross pins 27 are on 3" centers. To accommodate 160 cans per minute, such conveyor would be driven at a speed of 40 feet per minute (480 lineal inches per minute), and at this rate of movement the various sections of the machine would, for example, be given such dimensions that the cans would be in the heated spray wash section for 60 seconds, in the heated spray rinse section for 23 seconds, in the cold fresh water rinse section for 7 seconds, in the de-ionized water rinse section for 6 seconds, in the pressure blow-off section for 7 seconds, and in the heated air blow-off section for 90 seconds.

In the heated spray wash and heated spray rinse sections, the minimum temperature may be of the order of 180° F., while in the heated air blow-off section the temperature may be of the order of 235° F.

So far as its construction is concerned, the washer machine may be considered as consisting of four major sections, namely: a base section, a processing section, a main air heating and handling section, and a de-ionized water generator.

*The Base Section*

The base section consists of a base frame 55, a solution tank 56, the load station 21, the unloaded station 50, and the pump and drive mountings. The solution tank 56 is divided by a divider 57 into a wash-spray solution tank 56a and a rinse-spray solution tank 56b.

The base frame 55 consists of a rugged structural channel and angle base which provides support and continuity to the other components which are located at the base level.

The solution tanks 56a, 56b are provided with quick-opening marine-type clean-out doors for easy access to the tanks for maintenance purposes. Hinged covers are provided for removal and replacement of pump screens. Each tank is provided with a drain, drain valve, and an overflow, as shown in FIG. 1 of the drawing but no reference numerals have been assigned thereto.

The load station 21 has already been described and consists of an extension of the conveyor 22 having an appropriate opening in the upper track guide 23 for permitting cans from the loading machine to drop onto the lower track rails of the conveyor.

The unload station 50 has also been described and consists of an extension of the conveyor 22 in which the guide tracks 23, 24 are terminated at the point at which the conveyor passes vertically downward over the return sprocket so as to allow the cans to drop onto an unload conveyor, not shown.

The pump and drive mountings of the base section consist of a portion of the channel and angle base frame appropriately provided with a support for the wash-spray pump and motor 60, for the rinse-spray pump and motor 161, and for the drive assembly identified collectively by the reference numeral 162.

*The Processing Section*

The processing section consists of the supporting structure, the conveyor system, the spray nozzles, the electrical controls, and the exhaust fans.

The supporting structure for the processing section comprises a skeleton type frame consisting of formed structural shapes welded together to provide support for all of the internal and external attaching parts on the upper section of the machine. As already indicated, the upper structural frame is divided into seven separate flights or levels. Seven stainless steel troughs or pan-type dividers are provided, one between each stage and each pitched for proper drainage. Access to the interior of the machine is provided by a series of removable access doors which cover both sides of the machine giving access to any section for nozzle adjustment and general maintenance. Each access door is provided with an external run-back trough to preclude any leakage of solution out of the machine.

The conveyor system of the processing section has already been described in part. It should be mentioned, however, that while the conveyor 22 is illustrated as having two strands of roller chain, one on either side (i.e., one strand of links connecting rollers 35 and the other strand connecting rollers 25) it is not essential that the conveyor have connecting links on both sides. One strand of links, on the sprocket side, would suffice. In that case, the rollers 25 at the far end of the pins 27 would merely roll along the track 36 with no connecting links between the rollers.

In either event, that is, irrespective of whether the conveyor has two strands or one strand of links, the pins 27 are equipped with axially-adjustable guide collars 15 and 16 for pushing and guiding the cans along the guide tracks 23 and 24. The cans roll along lower track 24 as they move along a flight from the load end of the machine toward the unload end. After the cans make the 180° reversing turn at the unload end of the machine, they roll along track 23, this track being the lower track in flights in which the cans move from the unload toward the load end of the machine.

For moving the roller chain conveyor, sprocket wheels 61–72 are provided, the reference numerals being assigned in order beginning with sprocket wheel 61 at the load station 21 and ending with sprocket wheel 72 at the unload end of the machine. Each sprocket wheel is rotatable on a shaft supported in a suitable ball-bearing pillow block.

Sprocket wheel 71, at the unload end of the machine, is a take-up sprocket and the position of its shaft is adjustable laterally.

The conveyor 22 is driven by motor 73, variable-speed pulley 74, gear reducer 75, and a plurality of four roller chain drives 76–79, each of which is equipped with an individual disk friction clutch type of torque limiter 80–83. The roller chain drives 76–79 are seen most clearly in FIGS. 3 and 5. The details of one of the torque limiters, torque limiter 80, is illustrated in FIG. 6.

Drive motor 73 may, for example, be a 1 H.P., 1750 r.p.m. open ball-bearing drip proof motor. Variable-speed pulley 74 may, for example, be a Reeves No. 860. Gear reducer 75 may be a Winsmith type BT1.

In accordance with our present invention, every other flight is powered. Specifically, the shafts of sprocket wheels 64, 66, 68 and 70 at the unload ends of the machine at the top, third, fifth, and bottom flights, are each powered, being driven by the arrangement seen most clearly in FIGS. 3 and 5. At each of four driving points, a friction disk type of torque limiter is provided, identified by the reference numerals 80, 81, 82 and 83. By the arrangement shown, the load on the conveyor driving mechanism is distributed among four driving points and improves greatly the smoothness of movement of the conveyor through the machine. The torque limiters assist in the timing or synchronization of the drive.

Figure 2:
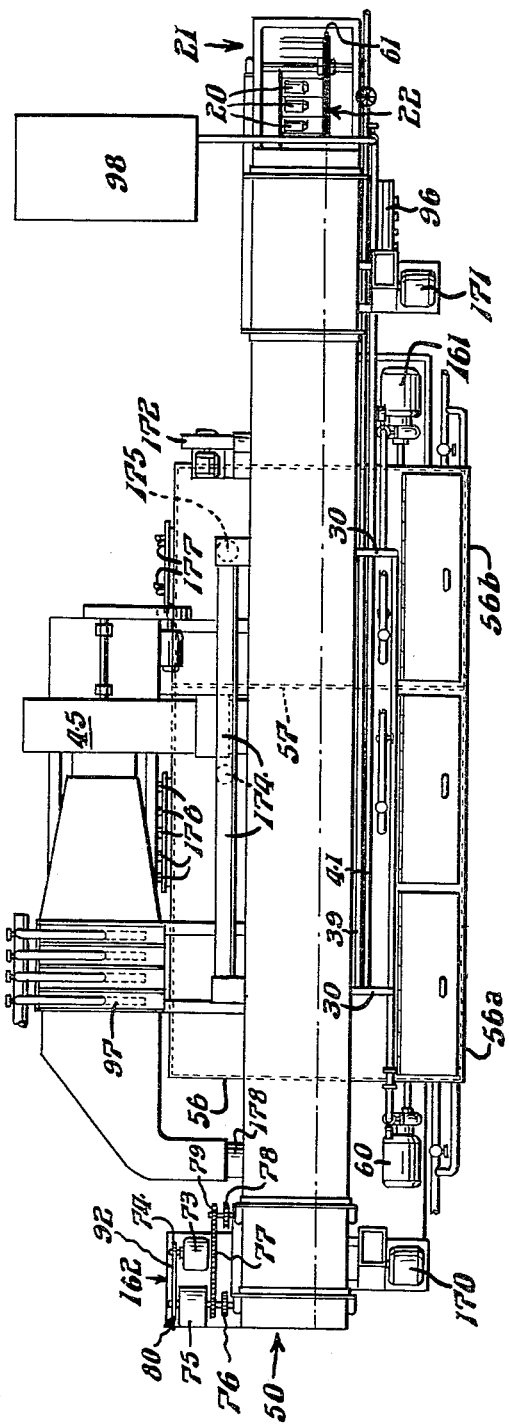
FIG. 2 is a diagrammatic plan view of the washer of FIG. 1.
Figure 3:
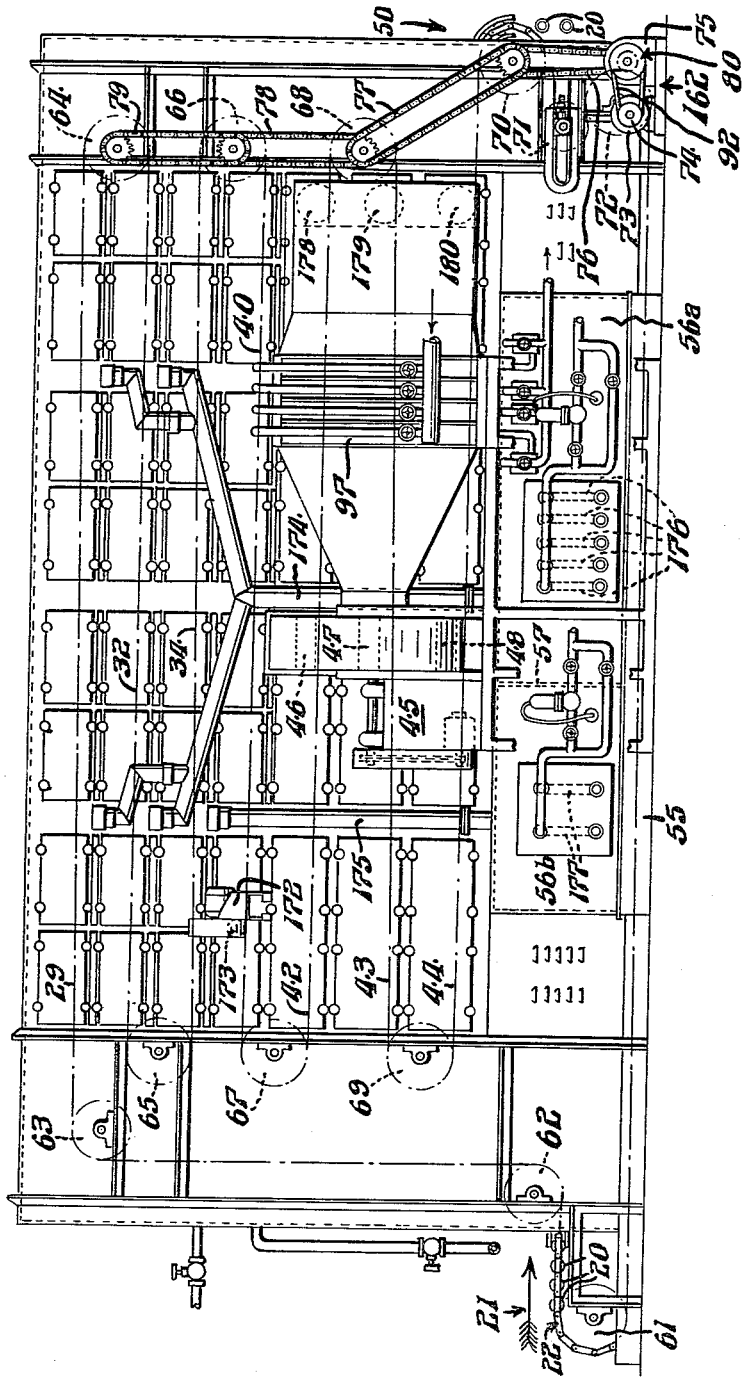
FIG. 3 is a diagrammatic rear elevational view of the washer of FIG. 1.

FIG. 6 shows the structural details of torque limiter 80, the position of this limiter in the drive system being clearly seen in the other figures of the drawing, particularly, FIGS. 2, 3 and 5.

Referring now to FIG. 6, torque limiter 80 is a known form of friction disk clutch type of limiter having such component parts as hub 84, friction disks 85 and 86, metal plates 88 and 89, dished spring 90, and nut 91. As seen in FIGS. 2 and 3, motor 73 and variable-speed drive 74 drive a belt 92 which in turn drives a pulley wheel 93 rotatably mounted on drive shaft 94 which drives gear reducer 75. It will be seen from FIG. 6 that the hub 84 is keyed to shaft 94, that the friction disks 85 and 86 and also the metal plates 88 and 89 are positioned on opposite sides of the pulley wheel 93, and that the adjusting nut 91 is adapted, through the dished spring 90, to control the amount of pressure exerted by the metal plates 88 and 89 on the friction disks 85 and 86. Thus, the drive belt 92 and pulley wheel 93 are adapted to drive shaft 94 and gear reducer 75 through the frictional engagement of the friction disks 85, 86 and the side surfaces of pulley wheel 93. The amount of slippage, for a particular setting of the adjusting nut 91 is, of course, proportional to the load on the shaft 94.

The processing section of the machine also contains the spray nozzles for the heated wash, for the heated rinse, for the fresh water rinse, and for the de-ionized water rinse.

The electrical controls are located in a unit control box 96 located near the load end of the machine, as seen in FIG. 2.

Two exhaust fans 170 and 171 are located near the upper ends of the machine. The cold air blow-off motor and fan 172 blows cold air through duct 173 to the conveyor in the cold air blow-off section.

The Main Air Handling Unit

The main air-handling unit of the machine consists of a steam-air heater 97, blower 45, and a supporting base.

The De-Ionized Water Generator

The de-ionized water generator is a self-contained unit 98 and may, for example, be an Illinois model 350 de-ionizer having a capacity of 300 g.p.h. as muanfactured by Illinois Water Treatment Company, Rockford, Illinois.

Miscellaneous

The pump for the heated wash stage may be a Marlow Model 2XSL rated at 225 gallons per minute at 120 foot head. The pump may be powered by 15 horsepower, 3450 r.p.m. motor. The pump and motor are identified in the drawing by the reference numeral 60.

The heated spray rinse pump may be a Marlow Type 1½ XSC rated at 90 gallons per minute at 120 foot head. This pump may be driven by a 5 horsepower, 3450 r.p.m. motor. This pump and motor are identified in the drawing by the reefrence numeral 161.

Both of the pumps mentioned above may be controlled by a magnetic starter mounted in the electrical control panel.

The spray nozzles in the heated wash stage may be stainless steel Spraying Systems No. 1/8GG–3004, ½ g.p.m. at 50 p.s.i., each.

The heated wash and heated rinse stages drain back to the storage tank 56 through drains 174 and 175 for recirculation. The cold fresh water rinse and the de-ionized water rinse drain to the sewer. However, by manipulation of the valves, the operator may divert the drain from the cold fresh water and from the de-ionized water rinse stages back to the rinse solution tank. Each solution tank is provided with overflow gutters, a drain line and an overflow line feeding into the drain line.

The wash and rinse solution tanks are heated by means of steam plate coils 176 and 177, respectively. Sufficient heat is provided in each stage to maintain an operating temperature of 180° F. minimum for spraying. Each solution tank is equipped with an American temperature regulator self-acting thermostatic steam regulating control valve to insure proper control of solution heat.

Air for the hot air blow-off is heated by steel fin steam heated air heaters operating at about 12 p.s.i.g. steam pressure. Air for the hot air blow-off is supplied by a New York blower No. 291GI fan. The hot air enters the hot air blow-off section through ducts 46, 47 and 48, and through perforations 181 in the three ducts 182. The hot air is returned from the hot air blow-off section through the heater 97 by way of ducts 178, 179 and 180.

Air for the cold air blow-off is provided by a special fan 172 having a capacity of approximately 400 cubic feet per minute at 4" static pressure. This fan is driven by a ¾ horsepower motor.

While the preferred embodiment of this invention has been described in some detail, it will be obvious to one skilled in the art that various modifications may be made without departing from the invention as hereinafter claimed.

Having described our invention, we claim:

1. A multi-flight multi-stage washer-degreaser machine for cylindrical metal containers, said machine comprising: a hot spray wash section and means for supplying a hot water wash solution thereto; a hot spray rinse section and means for supplying a hot water rinse solution thereto; a cold fresh water rinse section and means for supplying cold fresh water thereto; a de-ionized water rinse section and means for supplying de-ionized water thereto; a pressure blow-off section and means for supplying cold air thereto; a hot air blow-off section and means for supplying hot air thereto; conveyor means for rolling cylindrical metal containers through the said sections of said machine in the order given, said conveyor means having a plurality of flights and a serpentine configuration as viewed in elevation; and drive means for said conveyor at a plurality of alternate flight levels, each of said drive means including a torque-limiter device.

2. Apparatus as claimed in claim 1 characterized in that said conveyor comprises a roller chain having track rails running lengthwise and having transverse cross pins at spaced intervals, the spacing between said cross pins being slightly larger than the diameter of the cylindrical cans to be transported by said conveyor, whereby a single can is adapted to be dropped into each spacing, said track rails being located below said cross pins, whereby when said cans are pushed by said cross pins, said cans roll along said track rails.

3. Apparatus as claimed in claim 2 further characterized in that said conveyor is also provided with track rails above said cross pins for retaining said cans in the spaces between the cross pins.

4. Apparatus as claimed in claim 3 further characterized in that the loading section of said conveyor is provided only with track rails below said cross pins, thereby to allow cans to be fed into said conveyor.

5. Apparatus as claimed in claim 4 further characterized in that said cross pins are provided with collars adapted to push and guide said cans along said track rails.

References Cited in the file of this patent
UNITED STATES PATENTS

| | | |
|---|---|---|
| 1,391,141 | Paulson | Sept. 20, 1921 |
| 2,633,437 | Detjen | Mar. 31, 1953 |